United States Patent [19]

Mishiba et al.

[11] 4,381,365

[45] Apr. 26, 1983

[54] COPOLYMER LATEX AND ITS PRODUCTION

[75] Inventors: Saburo Mishiba; Junkoh Hyoda, both of Niihama; Akira Uchida, Nara; Hisao Usami, Izumi; Akira Watanabe, Yao, all of Japan

[73] Assignee: Sumitomo Naugatuck Co., Ltd., Osaka, Japan

[21] Appl. No.: 316,519

[22] Filed: Oct. 29, 1981

Related U.S. Application Data

[63] Continuation of Ser. No. 187,883, Sep. 17, 1980, abandoned.

[30] Foreign Application Priority Data

Sep. 17, 1979 [JP] Japan ............................ 54-120998
Sep. 19, 1979 [JP] Japan ............................ 54-121123

[51] Int. Cl.$^3$ ........................................ C08F 279/02
[52] U.S. Cl. ................................. 524/460; 524/534; 525/301; 525/902; 428/511
[58] Field of Search ............... 523/201; 524/458, 460; 525/301, 902

[56] References Cited

U.S. PATENT DOCUMENTS

| | | | |
|---|---|---|---|
| 2,859,201 | 11/1958 | Uraneck | 260/29.7 |
| 3,471,591 | 10/1969 | Lindsey | 260/879 |
| 3,793,244 | 2/1974 | Megee | 260/29.7 H |
| 3,793,402 | 2/1974 | Owens | 260/876 R |
| 4,134,872 | 1/1979 | Lee | 428/421 |
| 4,264,678 | 4/1981 | Nelsen | 525/301 |
| 4,265,977 | 5/1981 | Kawamura | 428/511 |

*Primary Examiner*—Paul R. Michl
*Attorney, Agent, or Firm*—Lawrence Rosen

[57] ABSTRACT

A process for preparing a copolymer latex by polymerization of at least one aliphatic conjugated diene monomer, at least one ethylenically unsaturated carboxylic acid monomer and at least one monoolefinic monomer copolymerizable with them in a weight proportion of 19.5–80:0.5–10:10–80, characterized in that (a) a mixture of the whole amount of the aliphatic conjugated diene monomer, the whole amount of the ethylenically unsaturated carboxylic acid monomer and a portion of the monoolefinic monomer, the combined amount of them being from 45 to 99% by weight on the basis of the total amount of the starting monomers, is subjected to emulsion polymerization, and (b) after or while the remainder of the monoolefinic monomer in an amount of from 1 to 55% by weight on the basis of the total amount of the starting monomers is added to the reaction mixture, the further emulsion polymerization is carried out.

13 Claims, No Drawings

COPOLYMER LATEX AND ITS PRODUCTION

This application is a continuation of Ser. No. 187,883, filed Sept. 17, 1980, now abandoned.

The present invention relates to a copolymer latex and its production. More particularly, it relates to a copolymer latex suitable for preparation of a paper coating composition and its production.

In recent years, remarkable progress has been made in offset printing processes toward multi-color and high-speed printing procedures. In order to satisfy the progress of these improved printing techniques, there has been a growing demand for paper having higher piling resistance, adhesive strength and water resistance with better ink transferability and blister resistance. In addition, such paper is required to have good quality and appearance. These performances of paper are much influenced by a coating composition applied on its surface. Thus, the appearance of a paper coating composition which can provide paper with the said desired performances has been highly demanded.

There are known various paper coating compositions. But, these conventional compositions are not suitable for providing paper with the said favorable performances, because their application for improvement of certain defects produces simultaneously some other drawbacks; for instance, their application for enhancement of blister resistance causes the depression of adhesive strength and sometimes of water resistance and gloss; further, for instance, their application for enhancement of multi-color offset ink transferablility results in the decrease of adhesive strength and water resistance.

In the recent trend on coated papers for printing, the demand on coated papers of medium quality containing mechanical pulp is much increased from the viewpoints of economy and saving of resources. Coated papers of medium quality has a relatively small amount of basis weight, and blister is hardly produced thereon in comparison with coated papers of high quality. However, the production of heat set roughening on passing through a heat set dryer is unavoidable, because they contain mechanical pulp. Prevention of such heat set roughening has been desired for enhancing the commercial value.

As the result of an extensive study, it has been found that a copolymer latex prepared by copolymerization of an aliphatic conjugated diene monomer, an ethylenically unsaturated carboxylic acid monomer and a monooolefinic monomer copolymerizable with them in a certain specific proportion at two stages can afford a paper coating composition, which provides paper with good and favorable performances, particularly in adhesiveness, water resistance, ink transferability, blister resistance, gloss, heat set roughening, etc.

The copolymer latex of this invention is obtainable by copolymerization of an aliphatic conjugated diene monomer, an ethylenically unsaturated carboxylic acid monomer and a monoolefinic monomer copolymerizable with them in a weight proportion of 19.5–80:0.5–10:10–80, characterized in that (a) a mixture of the whole amount of the aliphatic conjugated diene monomer, the whole amount of the ethylenically unsaturated carboxylic acid monomer and a portion of the monoolefinic monomer, the combined amount of them being from 45 to 99% by weight on the basis of the total amount of the monomers to be used as the starting materials, is subjected to emulsion polymerization (1st stage polymerization), and (b) after or while the remainder of the monoolefinic monomer in an amount of from 1 to 55% by weight on the basis of the total amount of the said starting monomers is added thereto, further emulsion polymerization (2nd stage polymerization) is carried out.

The aliphatic conjugated diene monomer may be, for instance, 1,3-butadiene, 2-methyl-1,3-butadiene, 2-chloro-1,3-butadiene or the like. This monomer is used in an amount of 19.5 to 80 parts by weight, particularly 19.5 to 60 parts by weight, more particularly 25 to 60 parts by weight, to 100 parts by weight of the total amount of the starting monomers. When it is used in a smaller amount, the adhesive strength is decreased. When it is used in a larger amount, the water resistance is insufficient.

As the ethylenically unsaturated carboxylic acid monomer, there may be employed acrylic acid, methacrylic acid, fumaric acid, maleic acid, itaconic acid, etc. This monomer is used in an amount of 0.5 to 10 parts by weight to 100 parts by weight of the total amount of the starting monomers. The use in a smaller amount results in decrease of the adhesive strength; further, the mechanical stability of the latex is lowered. The use in a larger amount makes the viscosity of the latex too high.

Examples of the monoolefinic monomer are alkenyl aromatic compounds (e.g. styrene, α-methylstyrene, methyl-α-methylstyrene, vinyltoluene, divinylbenzene), unsaturated carboxylic esters (e.g. methyl acrylate, methyl methacrylate, ethyl acrylate, ethyl methacrylate, butyl acrylate, butyl methacrylate, 2- ethylhexyl acrylate, glycidyl acrylate, glycidyl methacrylate, dimethyl fumarate, diethyl fumarate, dimethyl maleate, diethyl maleate, dimethyl itaconate, monomethyl fumarate, monoethyl fumarate), hydroxyalkyl group-containing unsaturated compounds (e.g. β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxybutyl methacrylate, di(ethylene glycol) maleate, di(ethylene glycol) itaconate, 2-hydroxyethyl maleate, bis(2-hydroxyethyl) maleate, 2-hydroxyethyl methyl fumarate), vinylic cyanide compounds (e.g. acrylonitrile, methacrylonitrile), etc. Among these monoolefinic monomers, one or more may be chosen; the combined use of the alkenyl aromatic compound, the unsaturated carboxylic ester and the hydroxyalkyl group-containing unsaturated compound, for instance, in a weight proportion of 30–60:3–30:0.5–6 is particularly preferred in assuring good mechanical stability of the latex, high water resistance and excellent adhesive strength. The monooefinic monomer is used in an amount of 10 to 80 parts by weight, particularly 30 to 80 parts by weight, to 100 parts by weight of the total amount of the starting monomers. When the amount is smaller than the lower limit, the water resistance is lowered. When the amount is larger than the upper limit, the adhesive strength is decreased. It is especially favored that the monoolefinic monomer subjected to emulsion polymerization at the step (b) contains the unsaturated carboxylic ester in an amount of not less than 50% by weight.

The polymerization of the starting monomers is effected in two stages. At the first stage, the whole amount of the aliphatic conjugated diene monomer, the whole amount of the ethylenically unsaturated carboxylic acid monomer and a portion of the monoolefinic monomer, their combined amount being from 45 to 99% by weight, preferably from 70 to 95% by weight, based on the total weight of the starting monomers, are subjected to emulsion polymerization. When the combined amount is less than 45% by weight, the water resistance and the adhesive strength are insufficient. When the combined amount is more than 99% by weight, the object of this invention can not be attained.

When the emulsion polymerization proceeds and the conversion of the starting monomers reaches 70% or more, the remainder of the monoolefinic monomer is added to the reaction system. If the addition of the remaining monoolefinic monomer is effected at the conversion being less than 70%, the water resistance and the adhesive strength are inferior. The term "conversion" hereinabove used is intended to mean the value (X) calculated according to the following equation:

$$X (\%) = \frac{\text{Weight of produced polymer}}{\text{Combined weight of monomers charged at initial stage}} \times 100$$

Then, the resultant mixture is further subjected to emulsion polymerization. If and when the emulsion polymerization at the first stage is perfected and the polymeric radical is completely consumed, a reaction initiator is to be added to the reaction system so as to reinitiate the polymerization.

The introduction of the starting monomers to the reaction system at the first and second stages may be carried out all in once or portionwise, or continuously or intermittently. For instance, the addition of the remaining monoolefinic monomer may be carried out in once prior to the proceeding of the second stage polymerization or portionwise during the proceeding of such polymerization. Thus, there is no substantial limitation on the manner of the introduction of the starting monomers.

Among the starting monomers, only the monoolefinic monomer should be introduced into the reaction system at the second stage. If the other monomer(s) is used in addition to such monoolefinic monomer at the second stage, the water resistance, the adhesive strength and the blister resistance will be deteriorated. The monoolefinic monomer to be added to the second stage reaction system may be at least one of the alkenyl aromatic compound, the unsaturated carboxylic ester and the hydroxyalkyl group-containing unsaturated compound, but their combination containing the unsaturated carboxylic ester in an amount of not less than 50% by weight is the most preferred.

On the polymerization at the first stage, there may be employed any conventional polymerization initiator as well as any conventional emulsifier. Specific examples of the polymerization initiator are water-soluble initiators (e.g. potassium persulfate, sodium persulfate, ammonium persulfate), Redox system initiators, oil-soluble initiators (e.g. benzoyl peroxide), etc. For assuring a higher water resistance, the amount of the emulsifier is preferred to be not more than 2 parts by weight to 100 parts by weight of the total amount of the starting monomers. Examples of the emulsifier are anionic surfactants (e.g. sulfuric esters of higher alcohols, alkylbenzene sulfonates, aliphatic sulfonates), nonionic surfactans (e.g. alkyl esters of polyethylene glycol, alkyl ethers of polyethylene glycol), etc. In addition to the polymerization initiator and the emulsifier, any other conventional additive(s) such as an electrolyte, a polymerization accelerator, a chain transfer agent (e.g. mercaptans, halogenated hydrocarbons) and a chelating agent may be introduced into the reaction system. Since the reaction mixture obtained as the result of the first stage polymerization is used for the polymerization at the second stage, it is not necessarily required to add to the reaction system any of the polymerization initiator, the emulsifier and the other additive(s) on the second stage polymerization. However, if necessary, such addition may be effected.

The copolymer latex prepared by the process of this invention is useful for preparation of a paper coating composition. For instance, uniform mixation of the copolymer latex with a mineral pigment (e.g. titanium oxide, satin white, kaolin, calcium carbonate) affords a paper coating composition. The coating composition may comprise, if desired, any other additive(s) such as a binder (e.g. starch casein, polyvinyl alcohol), a viscosity increasing agent, a crosslinking agent, a stabilizer, an anti-foaming agent and a surfactant. The combined amount of the copolymer latex (as the solid component) and the mineral pigment is usually from 30 to 85 parts by weight to 100 parts by weight of the coating composition. The weight proportion of the copolymer latex (as the solid component) and the mineral pigment is usually from 3:97 to 35:65.

Besides, it may be employed for any other use, for instance, it is usable as a carpet backing.

Practical embodiments of the invention are illustratively shown in the following Examples wherein part(s) and % are by weight unless otherwise indicated.

The test methods are as follows:

RI dry pick

The degree of picking when printed by the use of an RI printing machine was macroscopically observed and evaluated in the following criteria:
1—Best
2—Better
3—Ordinary
4—Worse
5—Worst The dry pick is represented by the average value on 6 specimens.

RI wet pick

The degree of picking when printed by the use of an RI printing machine employing wetting water was macroscopically observed and evaluated in the following criteria:
1—Best
2—Better
3—Ordinary
4—Worse
5—Worst The wet pick is represented by the average value on 6 specimens.

Gloss

Determined by JIS (Japanese Industrial Standard) P-8142, i.e. the method for testing the specular gloss of paper and paper board at 75 degree.

Print gloss

After printing with an offset printing ink by the use of an RI tester, the gloss was measured by the same method as above.

Multi-color printing offset ink transferability

Printing is effected by the use of an RI tester while providing with water by the aid of a rubber roll or a molten roll. The transferability of the ink was macroscopically observed and determined.

Blister resistance

The paper coated on the both sides is, after being printed, subjected to wet control (moisture content, about 6%) and then added to a heated oil bath, and the minimum temperature at which blister occurred was observed.

Heat set roughening resistance

A test piece of paper coated on the both sides is subjected to perfect printing by the use of an RI tester, and the test piece is dipped into silicone oil at 200°-250° C. for 5 seconds. The appearance of heat set roughening is macroscopically observed and evaluated in the following criteria:

1—Best
2—Better
3—Ordinary
4—Worse
5—Worst

The heat set roughening resistance is represented by the average value on 6 specimens.

EXAMPLE 1

Into a pressure-resistant reaction vessel, water (95 parts), sodium dodecylbenzenesulfonate (1.5 parts), dodecylmercaptan (0.2 part), sodium carbonate (0.4 part) and potassium persulfate (0.8 part) were charged, and the resultant mixture was stirred. Then, the monomers as shown in the column for "1st stage" of Table 1 were added thereto, and the temperaure was raised up to 60° C., whereby the polymerization proceeded. When the conversion reached to 85%, the monomer as shown in the column for "2nd stage" of Table 1 was added thereto, and the further polymerization was continued until the conversion became 99% or more.

From the reaction mixture, the unreacted monomers were eliminated by stripping, and the coagulated materials were removed by filtration through a net of 200 mesh to give a copolymer latex.

TABLE 1

| Copolymer latex | | Example | | | | Comparative Example | | |
|---|---|---|---|---|---|---|---|---|
| | | A | B | C | D | A' | B' | C' |
| 1st stage (part(s)) | Butadiene | 35 | 35 | 35 | 35 | 35 | 35 | 35 |
| | Itaconic acid | 3 | 3 | 3 | 3 | 3 | 3 | 3 |
| | Styrene | 59 | 55 | 37 | 10 | 2 | 62 | 0 |
| | Total | 97 | 93 | 75 | 48 | 40 | 100 | 38 |
| 2nd stage (part(s)) | Styrene | 3 | 7 | 25 | 52 | 60 | 0 | 62 |

EXAMPLE 2

Into a pressure-resistant reaction vessel, water (80 parts), sodium laurylsulfate (0.8 part), sodium bicarbonate (0.5 part), potassium persulfate (1.2 parts) and carbon tetrachloride (3 parts) were charged, and the resultant mixture was stirred. Then, the monomers as shown in the column for "1st stage" of Table 2 were added thereto, and the temperature was raised up to 60° C., whereby the polymerization proceeded. When the conversion reached to 98%, the temperature was elevated up to 65° C., and a mixture of the monomers as shown in the column for "2nd stage" of Table 2 was continuously added thereto in a proportion of 8 parts per hour, whereby the polymerization further proceeded. By elimination of the unreacted monomers and removal of the coagulated materials from the reaction mixture as in Example 1, there was obtained a copolymer latex.

TABLE 2

| Copolymer latex | | Example | | | Comparative Example | | | | |
|---|---|---|---|---|---|---|---|---|---|
| | | E | F*(1) | G | D'*(2) | E'*(2) | F' | G' | H' |
| 1st stage (part(s)) | Butadiene | 35 | 35 | 30 | 0 | 35 | 35 | 20 | 10 |
| | Acrylic acid | 0 | 3 | 2 | 2 | 0 | 2 | 3 | 3 |
| | Fumaric acid | 3 | 0 | 2 | 0 | 0 | 0 | 0 | 0 |
| | Styrene | 32 | 22 | 20 | 15 | 32 | 13 | 5 | 10 |
| | α-Methylstyrene | 0 | 20 | 0 | 0 | 0 | 0 | 0 | 0 |
| | Methyl methacrylate | 5 | 0 | 10 | 4 | 5 | 0 | 0 | 0 |
| | n-Butyl acrylate | 0 | 0 | 3 | 0 | 0 | 0 | 0 | 0 |
| | Total | 75 | 80 | 67 | 21 | 72 | 50 | 26 | 23 |
| 2nd stage (part(s)) | Butadiene | 0 | 0 | 0 | 25 | 0 | 35 | 0 | 25 |
| | Acrylic acid | 0 | 0 | 0 | 0 | 1 | 2 | 0 | 0 |
| | Itaconic acid | 0 | 0 | 0 | 2 | 2 | 0 | 0 | 0 |
| | Styrene | 20 | 20 | 20 | 30 | 20 | 13 | 30 | 52 |
| | Methyl methacrylate | 0 | 0 | 13 | 22 | 0 | 0 | 35 | 0 |
| | n-Butyl acrylate | 5 | 0 | 0 | 0 | 5 | 0 | 0 | 0 |
| | Total | 25 | 20 | 33 | 79 | 28 | 50 | 74 | 77 |

Note:
*(1)After the monomers were polymerized at the 1st stage and the conversion reached to 98%, the polymerization was once interrupted. Then, 20% aqueous solution of ammonium persulfate (2.5 parts) was added thereto, and the temperature was elevated up to 65° C. and styrene (20 parts) was continuously added thereto, whereby the polymerization further proceeded.
*(2)Itaconic acid was admixed with hot water in a weight proportion of 1:6 and introduced into the reaction system separately from the other monomers.

EXAMPLE 3

Into a pressure-resistant reaction vessel, water (90 parts), sodium laurylsulfate (0.5 part), potassium carbonate (0.3 part), carbon tetrachloride (5 parts), dodecylmercaptan (0.4 part), potassium persulfate (1.5 parts) and fumaric acid (2 parts) were charged, and the resultant mixture was stirred. The temperature was raised up to 70° C., and a mixture of the monomers as shown in the column for "1st stage" of Table 3 (except fumaric acid) was added thereto in a proportion of 5 parts per hour, whereby the polymerization proceeded. When the conversion reached to 90–95%, the monomers as shown in the column for "2nd stage" of Table 3 were added and the polymerization further proceeded. By elimination of the unreacted monomers and removal of the coagulated materials from the reaction mixture as in Example 1, there was obtained a copolymer latex.

TABLE 3

| Copolymer latex | | Example | | Comparative Example |
|---|---|---|---|---|
| | | H | I | I' |
| 1st stage (part(s)) | Butadiene | 35 | 30 | 35 |
| | Acrylic acid | 3 | 3 | 3 |
| | Fumaric acid | 2 | 2 | 2 |
| | Styrene | 13 | 18 | 30 |
| | Methyl methacrylate | 15 | 10 | 28 |

TABLE 3-continued

|  | Copolymer latex | Example H | Example I | Comparative Example I' |
|---|---|---|---|---|
| 2nd stage (part(s)) | β-Hydroxyethyl acrylate | 2 | 2 | 2 |
|  | Total | 80 | 65 | 100 |
|  | Styrene | 15 | 20 | 0 |
|  | Methyl methacrylate | 5 | 15 | 0 |
|  | Total | 20 | 35 | 0 |

EXAMPLE 4

Into a pressure-resistant reaction vessel, water (100 parts), sodium dodecylbenzenesulfonate (1.2 parts), dodecylmercaptan (0.5 part), sodium bicarbonate (1.2 parts), ammonium persulfate (0.8 part) were charged, and the resultant mixture was stirred. Then, the monomers as shown in the column for "1st stage" of Table 4 were added thereto, and the temperature was raised up to 60° C., whereby the polymerization proceeded. When the conversion reached to a certain extent as shown in Table 4, the monomers as shown in the column for "2nd stage" of Table 4 were added thereto, and the further polymerization was continued until the conversion became 99% or more.

From the reaction mixture, the unreacted monomers were eliminated by stripping, and the coagulated materials were removed by filtration through a net of 200 mesh to give a copolymer latex.

TABLE 4

|  | Copolymer latex | Example J | Example K | Example L | Example M |
|---|---|---|---|---|---|
| 1st stage (part(s)) | Butadiene | 30 | 40 | 35 | 35 |
|  | Acrylic acid | 3 | — | 2 | 2 |
|  | Itaconic acid | — | 2 | 2 | 2 |
|  | Methyl methacrylate | 5 | — | 10 | — |
|  | Ethyl acrylate | — | 3 | — | — |
|  | Styrene | 37 | 20 | 31 | 31 |
|  | α-Methyl styrene | — | 20 | — | — |
|  | β-Hydroxyethyl acrylate | 2 | 4 | 5 | 1 |
|  | Total | 77 | 89 | 85 | 71 |
|  | Conversion (%) | 90 | 91 | 88 | 90 |
| 2nd stage (part(s)) | Methyl methacrylate | 18 | 8 | 8 | 20 |
|  | Ethyl acrylate | — | — | 4 | — |
|  | Styrene | 5 | 3 | 3 | 7 |
|  | β-Hydroxyethyl acrylate | — | — | — | 2 |
|  | Total | 23 | 11 | 15 | 29 |

EXAMPLE 5

Into a pressure-resistant reation vessel, water (100 parts), sodium dodecylbenzenesulfonate (1.5 parts), dodecylmercaptan (0.4 part) and carbon tetrachloride (2 parts) were charged, and the resultant mixture was stirred. Then, the monomers as shown in the column for "1st stage" of Table 5 were added thereto, and the temperature was raised up to 65° C., whereby the polymerization proceeded. When the conversion reached to 98%, the monomers as shown in the column for "2nd stage" of Table 5 and potassium persulfate (0.3 part) were added thereto, and the further polymerization was continued at 68° C. until the conversion became 99.8% or more.

From the reaction mixture, the unreacted monomers were eliminated by stripping, and the coagulated materials were removed by filtration through a net of 200 mesh to give a copolymer latex.

TABLE 5

|  | Copolymer latex | Example N | Example O | Comparative Example J' | Comparative Example K' |
|---|---|---|---|---|---|
| 1st stage (part(s)) | Butadiene | — | 50 | 15 | 64 |
|  | 2-Methyl-1,3-butadiene | 30 | — | — | — |
|  | Itaconic acid | — | 1.5 | 2 | — |
|  | Acrylic acid | 3 | 1.5 | — | 2 |
|  | Methyl methacrylate | 5 | 3 | 14 | 3 |
|  | Styrene | 37 | 30 | 40 | 24 |
|  | β-Hydroxyethyl acrylate | 2 | 1 | 3 | — |
|  | Total | 77 | 87 | 74 | 93 |
| 2nd stage (part(s)) | Butadiene | — | — | 1 | 1 |
|  | Acrylic acid | — | — | 2 | 1 |
|  | Methyl methacrylate | 18 | 9 | 16 | 4 |
|  | Styrene | 5 | 3 | 5 | 2 |
|  | β-Hydroxyethyl acrylate | — | 1 | 2 | — |
|  | Total | 23 | 13 | 26 | 7 |

EXAMPLE 6

Using the copolymer latex obtained in Example 1, there were prepared a paper coating composition having a solid content of 62.5% according to the following prescription:

| Materials | Part(s) |
|---|---|
| Kaolin clay | 100 |
| Oxidized starch | 8 |
| Copolymer latex | 12 |

The coating composition was applied onto one surface of a paper by the aid of a trailing flexible blade coater at a speed of 200 m/min and dried with a wind speed of 30 m/min at 120° C. for 4 seconds. The amount of the coating composition applied was 12 g (as the solid components)/m$^2$. The paper was subjected to control of moisture at 20° C. under a relative humidity of 65% overnight and then to super calender treatment under a linear pressure of 80 kg/cm at 60° C. with a speed of 5 m/min and 2 nips.

The performances of the thus obtained coated paper are shown in Table 6.

TABLE 6

| Copolymer latex | Example A | Example B | Example C | Example D | Comparative Example A' | Comparative Example B' | Comparative Example C' |
|---|---|---|---|---|---|---|---|
| RI dry pick | 1.0 | 1.0 | 1.0 | 2.5 | 4.5 | 1.5 | 5.0 |
| RI wet pick | 2.0 | 1.0 | 1.0 | 2.0 | 4.5 | 3.5 | 5.0 |
| Gloss (%) | 56 | 58 | 59 | 60 | 60 | 52 | 60 |
| Print gloss (%) | 73 | 74 | 75 | 75 | 75 | 70 | 75 |
| Multi-color printing offset ink transferability | Better | Better | Best | Best | *(1) | Good | *(1) |

Note:
*(1)Not tolerable to offset printing due to production of pick.

EXAMPLE 7

Using the copolymer latex obtained in Example 2, there was prepared a paper coating composition having a solid content of 45% according to the following prescription:

| Materials | Part(s) |
|---|---|
| Kaolin clay | 75 |
| Calcium carbonate | 15 |
| Satin white | 10 |
| Casein | 8 |
| Copolymer latex | 10 |

The obtained coating composition was applied onto one surface of a paper by the use of a wire rod as in Example 6. The amount of the coating composition as applied was 20 g (as the solid components)/m².

The performances of the coating paper are shown in Table 7.

TABLE 7

| Copolymer latex | Example | | | Comparative Example | | | | |
|---|---|---|---|---|---|---|---|---|
| | E | F | G | D' | E' | F' | G' | H' |
| RI dry pick | 1.0 | 1.0 | 1.5 | 3.5 | 3.0 | 2.5 | 5.0 | 2.7 |
| RI wet pick | 1.5 | 1.7 | 2.0 | 4.0 | 3.5 | 5.0 | 4.0 | 4.5 |
| Gloss (%) | 63 | 62 | 65 | 63 | 62 | 55 | 65 | 62 |
| Print gloss (%) | 82 | 81 | 83 | 81 | 80 | 76 | 82 | 83 |
| Multi-color printing offset ink transferability | Best | Best | Better | Bad | Good | *(1) | Better | *(1) |

Note:
*(1)Not tolerable to offset printing due to the production of pick.

EXAMPLE 8

Using the copolymer latex obtained in Example 3, there was prepared a paper coating composition having a solid content of 63% according to the following prescription:

| Materials | Part(s) |
|---|---|
| Kaolin clay | 75 |
| Calcium carbonate | 25 |
| Modified starch | 7 |
| Copolymer latex | 10 |

In the same manner as in Example 6, the coating composition was applied on the both sides of a paper. The amount of the coating composition as applied was 10 g (as the solid components)/m² on one side.

The performances of the coated paper are shown in Table 8.

TABLE 8

| | Example | | Comparative Example |
|---|---|---|---|
| Copolymer latex | H | I | I' |
| RI dry pick | 2.5 | 2.5 | 5.0 |
| RI wet pick | 1.0 | 2.2 | 3.0 |
| Blister resistance (°C.) | 225 | 220 | 220 |
| Gloss (%) | 58 | 58 | 55 |
| Print gloss (%) | 74 | 75 | 70 |
| Multi-color printing offset ink transferability | Best | Best | Best |

EXAMPLE 9

Using the copolymer latex obtained in Example 4, there was prepared a paper coating composition having a solid content of 62% according to the following prescription:

| Materials | Part(s) |
|---|---|
| Kaolin clay | 70 |
| Calcium carbonate | 30 |
| Modified starch | 8 |
| Copolymer latex | 12 |

The coating composition was applied onto on the both sides of a paper by the aid of a trailing flexible blade coater and dried. The amount of the coating composition as applied was 10 g (as the solid components)/m² on one side. The paper was subjected to control of moisture at 20° C. under a relative humidity of 65% overnight and then to super calender treatment under a linear pressure of 80 kg/cm at 60° C. with a speed of 5 m/min and 2 nips.

The performances of the thus obtained coated paper are shown in Table 9.

TABLE 9

| | Example | | | |
|---|---|---|---|---|
| Copolymer latex | J | K | L | M |
| RI dry pick | 1.3 | 1.2 | 1.3 | 1.4 |
| RI wet pick | 1.4 | 1.5 | 1.5 | 1.2 |
| Blister resistance (°C.) | 225 | 220 | 220 | 225 |

EXAMPLE 10

Using the copolymer latex obtained in Example 4, there was prepared a paper coating composition having a solid content of 60% according to the following prescription:

| Materials | Part(s) |
|---|---|
| Kaolin clay | 100 |
| Dispersing agent | 0.2 |
| Modified starch | 7 |
| Copolymer latex | 12 |

The obtained coating composition was applied onto the both sides of a paper by the use of a wire rod. The amount of the coating composition as applied was 14 g (as the solid components)/m² on one side. After drying, the coated paper was subjected to super-calendering.

The performances of the coating paper are shown in Table 10.

TABLE 10

| | Example | | | |
|---|---|---|---|---|
| Copolymer latex | J | K | L | M |
| RI dry pick | 1.3 | 1.1 | 1.3 | 1.4 |
| RI wet pick | 1.3 | 1.5 | 1.7 | 1.2 |
| Heat set roughening resistance | 1.4 | 1.6 | 1.6 | 1.5 |

EXAMPLE 11

Using the copolymer latex obtained in Example 5, there was prepared a paper coating composition having a solid content of 60% according to the following prescription:

| Materials | Part(s) |
|---|---|
| Kaolin clay | 70 |
| Calcium carbonate | 30 |
| Dispersing agent | 0.2 |
| Modified starch | 7 |
| Copolymer latex | 10 |

In the same manner as in Example 7, the coating composition was applied on the both sides of a paper. The amount of the coating composition as applied was 14 g (as the solid components)/m$^2$ on one side. After drying, the coated paper was subjected to super-calendering.

The performances of the coated paper are shown in Table 11.

TABLE 11

| | Example | | Comparative Example | |
|---|---|---|---|---|
| Copolymer latex | N | O | J' | K' |
| RI dry pick | 1.2 | 1.1 | 3.5 | 2.0 |
| RI wet pick | 1.3 | 1.5 | 2.4 | 3.3 |
| Heat set roughening resistance | 1.3 | 1.3 | 2.0 | 1.9 |

What is claimed is:

1. A process for preparing a copolymer latex by polymerization of at least one aliphatic conjugated diene monomer, at least one ethylenically unsaturated carboxylic acid monomer and at least one monoolefinic monomer copolymerizable with them in a weight proportion of 19.5–80:0.5–10:10–80, which consists essentially of the following sequential steps (a) subjecting to emulsion polymerization a mixture of starting monomers comprising the whole amount of the aliphatic conjugated diene monomer, the whole amount of the ethylenically unsaturated carboxylic acid monomer and a portion of the monoolefinic monomer, the combined amount of them being from 45 to 99% by weight on the basis of the total amount of the starting monomers, and (b) after conversion of said starting monomers reaches 70% or more the remainder of the monoolefinic monomer in an amount of from 1 to 55% by weight of the basis of the total amount of the starting monomers is added to the reaction mixture, whereupon further emulsion polymerization is carried out; and wherein in each step said monoolefinic monomer is selected from the group consisting of styrene and mixtures of styrene with another monoolefinic monomer.

2. The process according to claim 1, wherein the combined amount of the monomers subjected to emulsion polymerization at the step (a) is from 70 to 95% by weight on the basis of the total amount of the starting monomers.

3. The process according to claim 1 or 2, wherein the aliphatic conjugated diene monomer is at least one of 1,3-butadiene and 2-methyl-1,3-butadiene.

4. The process according to claim 3, wherein the ethylenically unsaturated carboxylic acid monomer is at least one of acrylic acid, fumaric acid and itaconic acid.

5. The process according to claim 4, wherein the other monoolefinic monomer is at least one of alkenyl aromatic compounds, unsaturated carboxylic esters and hydroxyalkyl group-containing unsaturated compounds.

6. The process according to claim 5, wherein the monoolefinic monomer is at least one of styrene and methyl methacrylate.

7. The process according to claim 5, wherein the monoolefinic monomer is a mixture of styrene and an unsaturated carboxylic ester.

8. The process according to claim 7, wherein the unsaturated carboxylic ester is at least one of methyl methacrylate and n-butyl acrylate.

9. The process according to claim 5, wherein the monoolefinic monomer is a mixture of styrene, and unsaturated carboxylic ester and a hydroxyalkyl group-containing unsaturated compound.

10. The process according to claim 9, wherein the unsaturated carboxylic ester is at least one of methyl methacrylate, n-butyl acrylate and the hydroxyalkyl group-containing unsaturated compound is at least one $\beta$-hydroxyethyl acrylate and $\beta$-hydroxyethyl methacrylate.

11. The process according to claim 9, wherein the weight proportion of the styrene, the unsaturated carboxylic ester and the hydroxyalkyl group-containing unsaturated compound is 30–60:3–30:0.5–6.

12. The process according to claim 11, wherein the monoolefinic monomer subjected to emulsion polymerization at the step (b) contains the unsaturated carboxylic ester in an amount of not less than 50% by weight.

13. A copolymer latex prepared by the process according to claim 1.

* * * * *